United States Patent
Costea et al.

(10) Patent No.: US 7,882,561 B2
(45) Date of Patent: Feb. 1, 2011

(54) SYSTEM AND METHOD OF CACHING DECISIONS ON WHEN TO SCAN FOR MALWARE

(75) Inventors: Mihai Costea, Redmond, WA (US); Adrian M. Marinescu, Sammamish, WA (US); Anil Francis Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1208 days.

(21) Appl. No.: 11/047,810

(22) Filed: Jan. 31, 2005

(65) Prior Publication Data

US 2006/0174344 A1  Aug. 3, 2006

(51) Int. Cl.
*G06F 11/00* (2006.01)
(52) U.S. Cl. .......................................... 726/24; 713/188
(58) Field of Classification Search ............. 726/22–25; 713/188
See application file for complete search history.

(56) References Cited

U.S. PATENT DOCUMENTS

| | | | | |
|---|---|---|---|---|
| 5,649,095 A * | 7/1997 | Cozza | ..................... | 714/39 |
| 5,948,104 A * | 9/1999 | Gluck et al. | ................... | 726/24 |
| 5,956,481 A * | 9/1999 | Walsh et al. | .................. | 726/23 |
| 6,269,456 B1 * | 7/2001 | Hodges et al. | ................ | 714/38 |
| 6,735,700 B1 * | 5/2004 | Flint et al. | ..................... | 726/24 |
| 6,928,555 B1 * | 8/2005 | Drew | ........................... | 726/24 |
| 6,976,251 B2 * | 12/2005 | Meyerson | ................... | 717/173 |
| 7,096,501 B2 * | 8/2006 | Kouznetsov et al. | .......... | 726/24 |
| 7,188,367 B1 * | 3/2007 | Edwards et al. | ............... | 726/24 |
| 7,210,041 B1 * | 4/2007 | Gryaznov et al. | ........... | 713/188 |
| 7,263,561 B1 * | 8/2007 | Green et al. | ................ | 709/246 |
| 7,290,282 B1 * | 10/2007 | Renert et al. | .................. | 726/24 |
| 7,415,726 B2 * | 8/2008 | Kelly et al. | .................... | 726/24 |
| 2003/0145228 A1 * | 7/2003 | Suuronen et al. | ............ | 713/201 |
| 2004/0158730 A1 * | 8/2004 | Sarkar | ........................ | 713/200 |
| 2005/0038881 A1 * | 2/2005 | Ben-Itzhak | ................. | 709/223 |
| 2005/0120238 A1 * | 6/2005 | Choi | ........................... | 713/200 |

* cited by examiner

*Primary Examiner*—Nirav Patel
(74) *Attorney, Agent, or Firm*—Workman Nydegger (57) ABSTRACT

In accordance with this invention, a system, method, and computer-readable medium that selectively scans files stored on a computing device for malware is provided. One aspect of the present invention includes identifying files that need to be scanned for malware when a software update that includes a malware signature is received. More specifically, attributes of the new malware are identified by searching metadata associated with the malware. Then, the method searches a scan cache and determines whether each file with an entry in the scan cache is the type that may be infected by the malware. If a file is the type that may be infected by the malware, the file is scanned for malware when a scanning event such as an I/O request occurs. Conversely, if the file is not the type that may be infected by the malware, the file may be accessed without a scan being performed.

8 Claims, 4 Drawing Sheets

SYSTEM AND METHOD OF CACHING DECISIONS ON WHEN TO SCAN FOR MALWARE

FIELD OF THE INVENTION

The present invention relates to computing devices and, more particularly, to protecting a computing device from malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks, such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems that are communicatively connected by a network connection.

A traditional defense against computer malware and, particularly, against computer viruses and worms, is commercially available antivirus software that is available from numerous software vendors. Most antivirus software identifies malware by matching patterns within data to what is referred to as a "signature" of the malware. Typically antivirus software scans for malware signatures when certain events are scheduled to occur, such as when data is going to be written or read from an input/output ("I/O") device. As known to those skilled in the art and others, computer users have on-going needs to read and write data to I/O devices, such as hard drives, floppy disks, compact disks ("CDs"), etc. For example, a common operation provided by some software applications is to open a file stored on an I/O device and display the contents of the file on a computer display. However, since opening a file may cause malware associated with the file to be executed, antivirus software typically performs a scan or other analysis of the file before the open operation is satisfied. If malware is detected, the antivirus software that performed the scan may prevent the malware from being executed, for example, by causing the open operation to fail.

As known to those skilled in the art and others, scanning a file for malware is a resource intensive process. As a result, modern antivirus software optimizes the process of scanning for malware. For example, some antivirus software implement a scan cache that tracks the state of files on a computing device with regard to whether the files are infected with malware. Tracking the state of files with a scan cache or equivalent mechanism prevents unnecessary scans from being performed. More specifically, when a file is scanned for malware, a variable is associated with the file in the scan cache that is indicative of whether the file is infected with malware. In instances when a file is not infected, a successive scan of the file is not performed unless the file is modified or the antivirus software is updated. Since user applications will frequently make successive I/O requests directed to the same file, implementing a scan cache may result in significant improvement in the speed in which antivirus software executes.

Numerous software vendors market antivirus software applications and maintain an ever-growing database of malware signatures. In fact, one of the most important assets of antivirus software vendors is the knowledge base of signatures collected from known malware. Typically, when a new malware is identified, software vendors provide a software update to antivirus software that contains a signature for the new malware. When the update is installed on a computing device, the antivirus software is able to identify the new malware. However, the antivirus software is not able to quickly determine if previously scanned files that maintain an entry in a scan cache are infected with the new malware. Thus, when a software update is installed that is able to recognize a new malware, entries in the scan cache are reset. As a result, the performance benefit provided by the scan cache is not available until files on the computing device are re-scanned, which is a resource intensive process. Stated differently, by resetting entries in a scan cache, every file on a computing device will be scanned for malware even in instances when the new malware is not able to infect certain types of files.

SUMMARY OF THE INVENTION

The present invention addresses the above-identified needs by providing a system, method, and computer readable medium of selectively scanning files on a computing device for malware. One aspect of the present invention is a method that identifies the files on a computing device that need to be scanned for malware when a software update that includes a new malware signature is received. More specifically, the method includes identifying attributes of the malware by searching metadata included in the software update. Then, the method searches a scan cache and determines whether each file with an entry in the scan cache is the type that may be infected by the malware. If a file is the type that may be infected by the malware, the file is scanned by antivirus software when a scanning event such as an I/O request occurs. Conversely, if the file is not the type that may be infected by the malware and the file has not been previously identified as being infected, the file may be accessed without a scan being performed.

Another aspect of the present invention is a method that determines whether a software update to antivirus software designed to detect new malware needs to be installed on a computing device. This aspect of the present invention identifies attributes of the computing device from configuration data. In response to receiving a software update designed to detect new malware, the method searches metadata associated with the software update for attributes of the new malware. Then a determination is made regarding whether the new malware is capable of infecting the computing device. In instances when the new malware is capable of infecting the computing device, the method causes the software update to be installed.

In yet another aspect of the present invention, a software system that improves the performance of a computing device by selectively scanning files for malware is provided. In one embodiment of the present invention, the software system includes a scan engine, a scan optimization module, a signature database, and a scan cache. The scan engine compares malware signatures maintained in the signature database with file data stored on the computing device. However, to reduce the amount of data scanned by the scan engine, the scan optimization module identifies the files stored on the computing device that are capable of being infected when a software update that contains a new malware signature is received. Data stored in the scan cache is altered so that the scan engine only scans the files that are capable of being infected by the new malware.

In still another embodiment, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In accordance with this invention, a system, method, and computer-readable medium that selectively scans files stored on a computing device for malware is provided. One aspect of the present invention includes identifying files that need to be scanned for malware when a software update that includes a malware signature is received. More specifically, attributes of the new malware are identified by searching metadata associated with the malware. Then, the method searches a scan cache and determines whether each file with an entry in the scan cache is the type that may be infected by the malware. If a file is the type that may be infected by the malware, the file is scanned for malware when a scanning event such as an I/O request occurs. Conversely, if the file is not the type that may be infected by the malware, the file may be accessed without a scan being performed.

Although the present invention will primarily be described in the context of reducing the amount of data scanned for malware, those skilled in the relevant art and others will appreciate that the present invention is also applicable to other areas than those described. The following description first provides an overview of a system in which the present invention may be implemented. Then methods that implement the present invention are described. The illustrative examples provided herein are not intended to be exhaustive or to limit the invention to the precise forms disclosed. Similarly, any steps described herein may be interchangeable with other steps or combinations of steps in order to achieve the same result.

Figure 1:
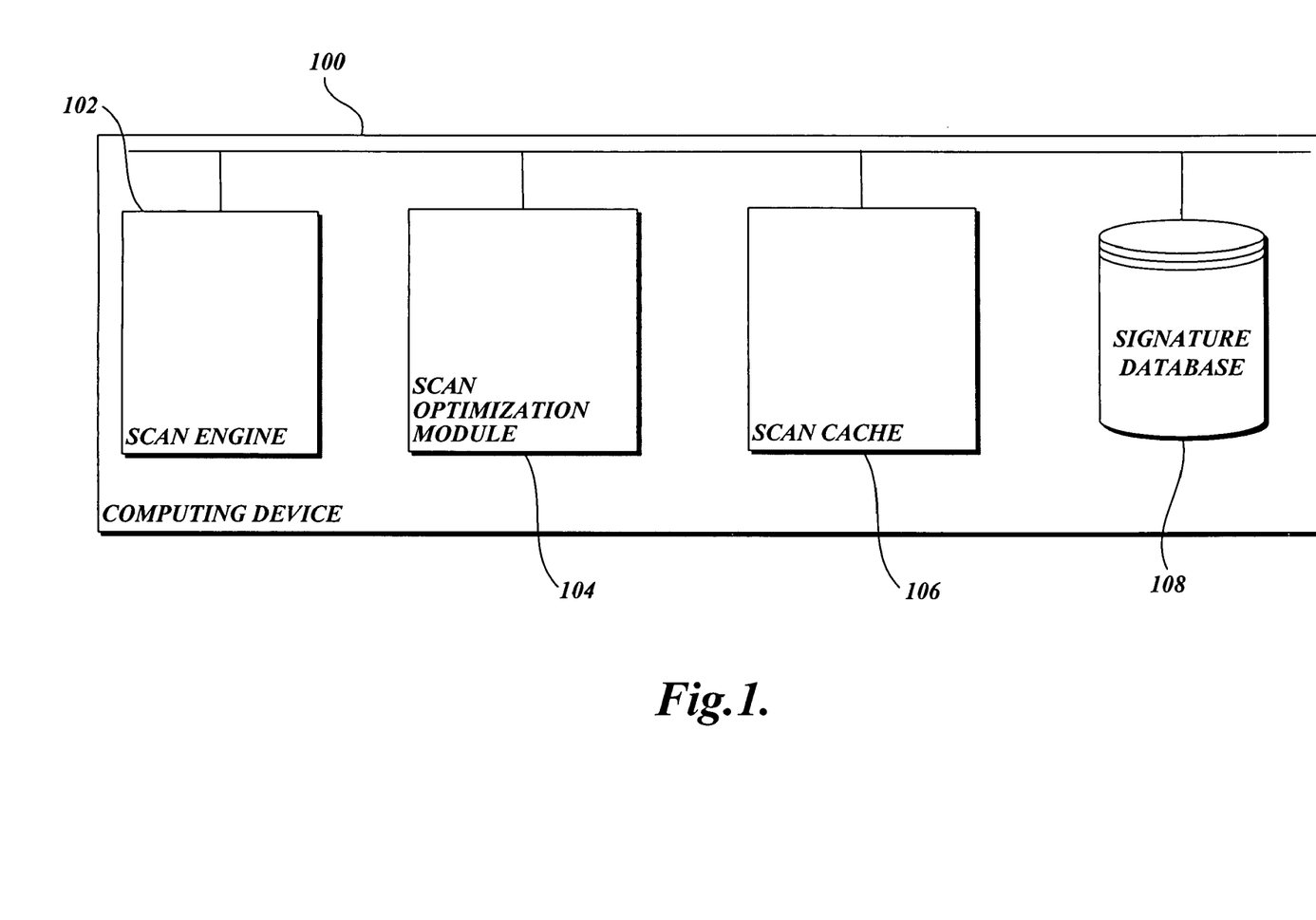
FIG. 1 is a block diagram of the components of a computing device that includes a software module suitable to prevent unnecessary scans for malware in accordance with the present invention.

Referring now to FIG. 1, the following is intended to provide an exemplary overview of one suitable computing device 100 in which the present invention may be implemented. The computing device 100 may be any one of a variety of devices including, but not limited to, personal computing devices, server-based computing devices, personal digital assistants, cellular telephones, other electronic devices having some type of memory, and the like. For ease of illustration and because it is not important for an understanding of the present invention, FIG. 1 does not show the typical components of many computing devices, such as a CPU, keyboard, a mouse, a printer, or other I/O devices, a display, etc. However, as illustrated in FIG. 1, the computing device 100 includes a scan engine 102, a scan optimization module 104, a scan cache 106, and a signature database 108. In general terms describing one embodiment of the present invention, components of the computing device 100 provide a way to efficiently scan files stored on the computing device 100 for malware.

As illustrated in FIG. 1, the computing device 100 includes a scan engine 102 designed to detect malware in a file. Many different software vendors include a scan engine or equivalent mechanism in antivirus software that is designed to identify data characteristic of malware. One known technique employed by some existing antivirus software for identifying malware includes obtaining a copy of the malware "in the wild." Then program code that implements the malware is processed with a hash function that converts the program code into a "signature" which may be used to uniquely identify the malware. Then, in response to an event, such as an I/O request, the antivirus software searches data associated with the request for any known malware signatures. The scan engine 102 illustrated in FIG. 1 may employ this known technique to scan file data for a malware signature. However, the scan engine 102 may be configured to perform additional types of analysis in order to determine if a file is infected with malware. For example, some antivirus software "emulate" program execution to detect behaviors that are characteristic of malware. Also, increasingly, heuristic techniques are being used to detect malware. In any event it should be well understood that any of these and other malware detection techniques not described herein may be implemented in the scan engine 102.

As illustrated in FIG. 1, the computing device 100 includes a scan optimization module 104 that contains the software routines implemented by the present invention. The scan optimization module 104 improves the performance of the computing device 100 by reducing the number of files that need to be scanned for malware. In one embodiment of the present invention, when a new malware signature is received, the scan optimization module 104 identifies the files stored on the computing device 100 that are capable of being infected by the new malware. More specifically, data stored in the scan cache 106 (described below) that describes attributes of files stored on a computing device 100 are compared to attributes of the new malware. If the new malware is capable of infecting a file, the variables associated with the file in the scan cache 106 may be changed so that the file is scanned for malware before the file is accessible.

The computing device 100 also includes a scan cache 106 that stores information about each file on the computing device 100. Some functions of a scan cache 106 are generally known by those skilled in art. For example, user applications will frequently make successive I/O requests directed to the same file. In this instance, antivirus software may scan the file for malware before the first I/O request is satisfied. In instances when the file is not infected with malware, the successive I/O requests directed to the file do not trigger a scan of the file. Instead, the scan cache 106 tracks whether a file is or is not infected with malware so that unnecessary scans are not performed. More specifically, in one type of scan cache, files are categorized as being (1) known malware, (2) known safe, or (3) unknown with regard to being infected with malware. A file in the "known safe" category is not scanned for malware when an I/O request or other scanning event is directed to the file.

As mentioned previously, when a new malware begins spreading on a communication network, software vendors typically provide an update to antivirus software so that the new malware may be identified. In the prior art, when a new software update is received, files that are identified as being "known safe" in the scan cache 106 are changed to the "unknown" category. Obviously a file in the "unknown" category is scanned for malware when an I/O request or other scanning event is directed to the file. However, the new malware may only be capable of infecting certain types of files. As a result, scanning a file that was previously identified as being free from a malware infection may not always be necessary when a software update designed to detect new malware is received. Thus, the present invention adds file attributes to the scan cache 106 so that unnecessary scans for malware are not performed. More specifically, the file attributes included in the scan cache 106 by aspects of the present invention, allow the scan optimization module 102 to determine whether a file is capable of being infected with a new malware.

As further illustrated in FIG. 1, the computing device 100 includes a signature database 108 that stores malware signatures. For each malware identified by the scan engine 102, the signature database 108 contains a signature of the malware generated using a hash function. When the scan engine 102 scans file data, malware signatures in the signature database 108 are referenced for a match. Thus in instances when a new malware is identified, a signature of the malware is included in the signature database 108.

As illustrated in FIG. 1, each component of the computing device 100, e.g., the scan engine 102, scan optimization module 104, scan cache 106, and signature database 108 are interconnected and able to communicate with other components. As known to those skilled in the art and others, FIG. 1 is a simplified example of one computing device 100 capable of performing the functions of the present invention. Actual embodiments of the computing device 100 will have additional components not illustrated in FIG. 1 or described in the accompanying text. Also, FIG. 1 shows one component architecture for minimizing the amount of data scanned for malware, but other component architectures are possible. Thus, FIG. 1 should be construed as exemplary and not limiting.

Figure 2:
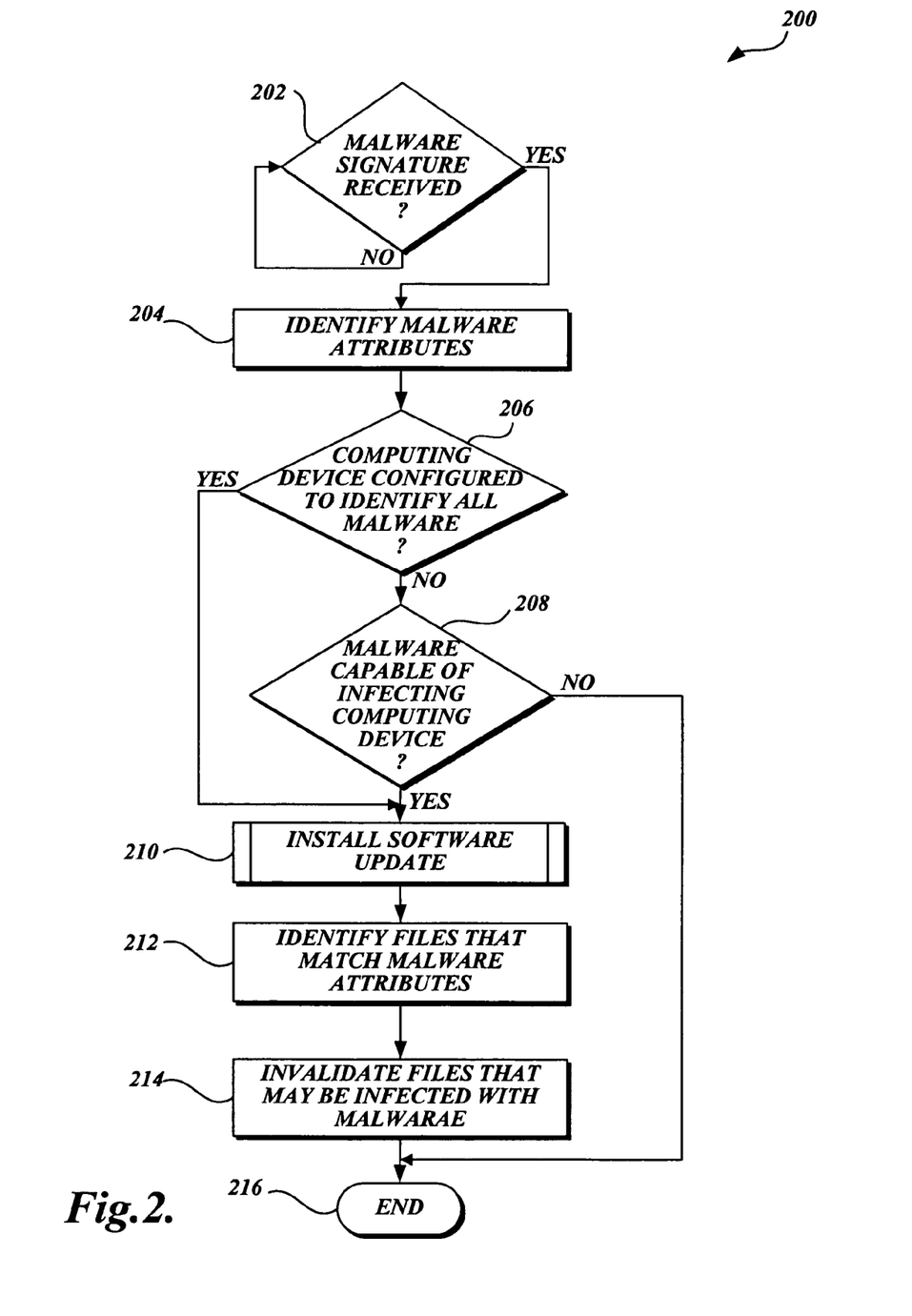
FIG. 2 is a flow diagram illustrating one exemplary embodiment of a method that updates a scan cache to reduce the amount of data scanned for malware in accordance with the present invention.

FIG. 2 is a flow diagram illustrating one exemplary embodiment of an update method 200 formed in accordance with the present invention. In summary, the method 200 reduces the amount of data scanned for malware when a software update that contains a new malware signature is received. To reduce the amount of data scanned, attributes of the malware are identified and information stored on the computing device is updated. If the attributes of the malware indicate that the malware is capable of infecting the computing device, the method 200 searches a database (e.g., scan cache 106) for files and/or data types which may be infected by the malware. The update method 200 may change entries in the scan cache so that files and/or data types that are capable of being infected for the malware are scanned when an I/O or similar event occurs. With continuing reference to FIG. 1 and the accompanying descriptions, an exemplary update method 200 illustrated in FIG. 2 will now be described.

As illustrated in FIG. 2, the update method 200 remains idle, at block 202, until a new malware signature is received at a computing device that implements the present invention. In one embodiment of the method 200, software updates that contain signatures of new malware are automatically obtained from a download center. In this instance, a software update may be obtained at regular intervals (i.e., hourly, daily, weekly, monthly, etc.) or whenever a new software update becomes available. Also, a software update that contains a new malware signature may be obtained manually. For example, a user may determine that a computing device is vulnerable to a malware infection and download a software update that is published on a Web site. However, those skilled in the art and others will recognize that a new malware signature may be received in different instances than those described above. Thus, the examples provided above that describe ways in which a malware signature may be received by a computing device should be construed as exemplary and not limiting.

At block 204, the update method 200 identifies attributes of the malware represented by the malware signature received at block 202. Typically, when a new malware is detected, an anti-virus software developer analyzes malware program code in order to identify attributes of the malware. For example, an anti-virus software developer may find that a new malware (1) is a virus that attaches itself to a word processing document, (2) is spread as an attachment to an email message and (3) and is only able to infect computing devices with a older version of an email application program installed. In accordance with one embodiment of the present invention, metadata is appended to malware signatures by a software developer and included in the software update received at block 202. As described in more detail below, the metadata describes attributes of the malware including but not limited to (1) computer platforms, (2) operating systems, (3) and file/data types that may be infected by the malware. Thus, at block 204, the update method 200 identifies attributes of the malware by searching metadata that is appended to a malware signature.

As illustrated in FIG. 2, at decision block 206, the update method 200 determines if the computing device that implements the present invention is configured to identify all malware. Software formed in accordance with the present invention may obtain data from a user or system administrator regarding whether to scan for all malware or only malware that has the potential to infect the computing device that implements the present invention. Typically, a computing device will be configured to identify all malware regardless of whether the specific device is capable of being infected. By scanning for all malware, the spread of malware to other computing devices that are capable of being infected is prevented. However, in some instances it may be desirable for a computing device to be configured to identify a smaller set of malware that is only capable of infecting a specific type of device. For example, some server-based computing devices act as a distribution point for a one type of content (e.g. Web pages). In this instance, performing a scan for all malware may cause an unacceptable performance degradation in the computing device. Instead, the server-based device may be configured to only identify malware that is capable of infecting the device. As a result, the overhead required to perform scans for malware is significantly reduced. In any event, if the update method 200 determines that a computing device is configured to identify all malware, the method 200 proceeds to block 210, described below. Conversely, if the method 200 determines that a computing device is configured to only identify malware that is capable of causing an infection on the specific device, the method 200 proceeds to block 208.

At decision block 208, the update method 200 determines if the new malware is capable of infecting a computing device that implements the present invention. In order to determine if the computing device may be infected, an analysis of configuration data stored on the computing devices is performed. As known to those skilled in the art and others, modern computing devices maintain databases from which configuration data may be obtained. For example, the system registry is a database used to store settings, options, and preferences regarding the operation of a computing device, including settings for all the hardware and user preferences. The system registry also stores references to the operating system and application programs installed on a computing device. At block 208, the update method 200 analyzes the system registry and other configuration data of the computing device. Then the configuration data is compared to the attributes of the malware identified at block 204 to determine if the computing device is capable of being infected with the malware. As illustrated in FIG. 2, if the malware is capable of infecting the computing device that implements the present invention, the update method 200 proceeds to block 210. Conversely, if the malware is not capable of infecting the computing device, the method 200 proceeds to block 216 where it terminates.

As illustrated in FIG. 2, the software update that contains a new malware signature is installed on a computing device at block 210. Also, the new malware signature and associated metadata are included in the signature database 100 (FIG. 1). Since any one of a number of available software systems may be used to install the software update at block 210, a description of the software system used by the present invention will not be provided here.

At block 212, the update method 200 searches a database, such as the scan cache 106 (FIG. 1), for files that may be infected with the new malware. As mentioned previously, some antivirus systems implement a scan cache that contains information about each file stored on a computing device. In these antivirus systems, the scan cache tracks whether a file is or is not infected with malware so that unnecessary scans for malware are not performed. For example, a file will not be scanned for malware that was previously identified as being free from a malware infection. However, if a new malware is identified, data in the scan cache may be changed to account for the new malware. More specifically, data associated with a file previously identified as being free from a malware infection may be changed so that the file is scanned for malware when a scanning event, such as an I/O request occurs. In accordance with one aspect of the present invention, a "granular" scan cache 106 is provided that enables the update method 200 to identify files on a computing device that have the potential to be infected by a new malware.

Figure 3:
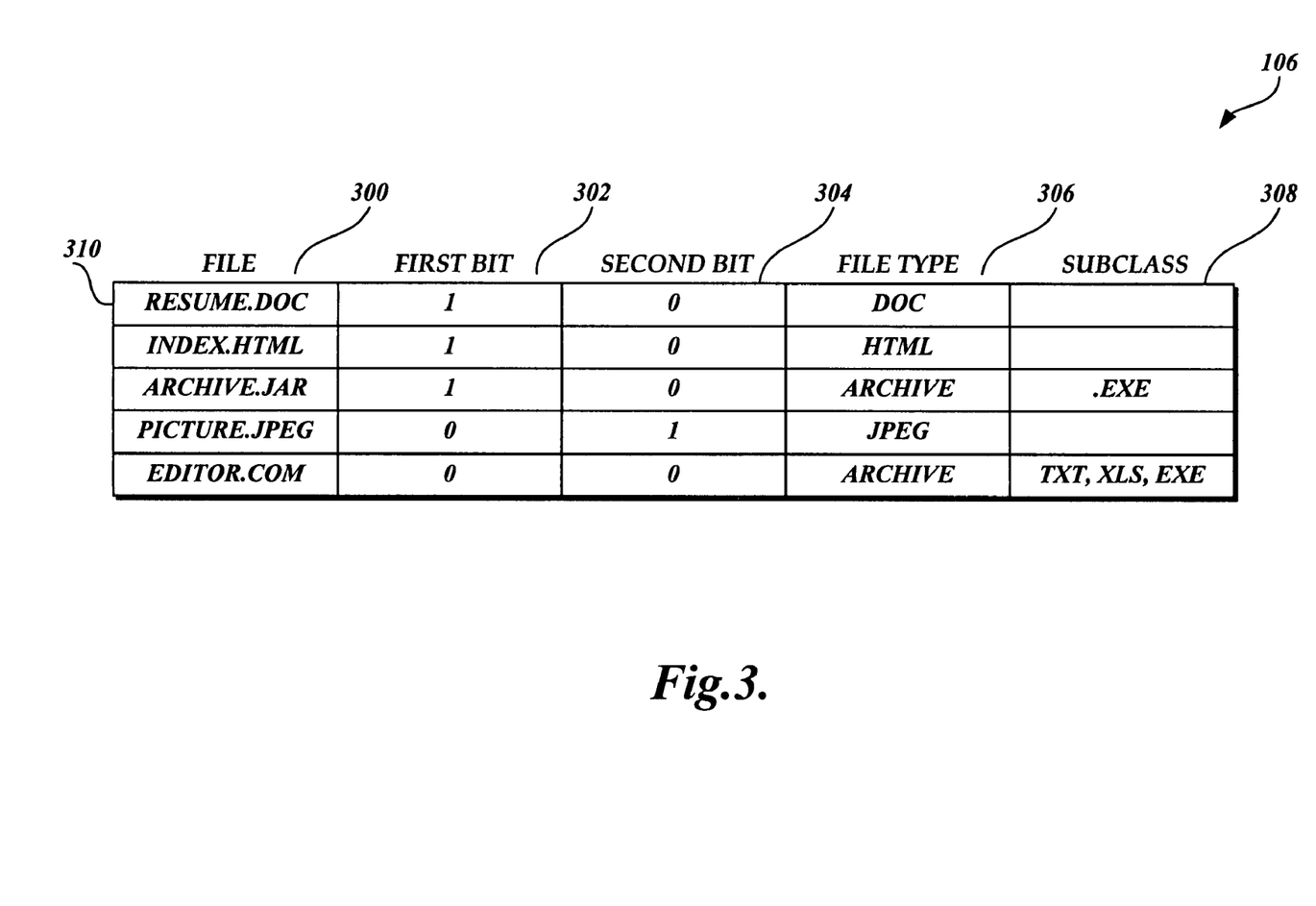
FIG. 3 is a pictorial depiction of an exemplary scan cache with entries designed to reduce the amount of data scanned for malware in accordance with the present invention.

For illustrative purposes and by way of example only, a representative scan cache 106 is illustrated in FIG. 3. The scan cache 106 consists of five columns, each of which contains multiple entries. The columns are identified as FILE ID 300, FIRST BIT 302, SECOND BIT 304, FILE FORMAT 306, and SUBCLASS 308. The FILE ID 402 column contains a unique identifier for each file stored on a computing device such as a file name. The FIRST BIT 302, and SECOND BIT 304 columns each store a value that collectively identifies the state of the file. For example, both the FIRST BIT 302 and SECOND BIT 304 columns contain a value that is either a "0" or a "1." In one embodiment of the present invention, if the FIRST BIT 302 column contains a "1" and the SECOND BIT 304 column contains a "0," then the state of the file is "known malware." Alternatively, if the FIRST BIT 302 column contains a "0" and the SECOND BIT 304 column contains a "1," then the state of the file is "known good." Also, if the FIRST BIT 302 column contains a "0" and the SECOND BIT 304 column contains a "0," then the state of the file is "unknown" with regard to being infected with malware.

As further illustrated in FIG. 3, the FILE TYPE 306 column contains data that identifies the format of a file. Those skilled in the art and others will recognize that files associated with a computing device may serve different purposes. For example, a modern computing device may have many different application programs installed that perform a variety of functions. As a result, files typically have a file type that defines the formatting of the file. Also, the scan cache 106 includes a SUBCLASS 308 column that may contain additional information about a file. As illustrated in FIG. 3, the SUBCLASS 306 column may not contain an entry for every file or may contain multiple entries depending on the attributes of a file. For example, modern computing devices allow a set of files to be "archived" into a single file in order to save storage space. In this instance, the SUBCLASS 308 column may contain a file type for each file that is contained in an archived file. However, this is just one example in which the SUBCLASS 308 column may be used to store additional information about a file. As described in more detail below, by including the FILE TYPE 306 column and SUBCLASS 308 column in the scan cache 106, the present invention is able to minimize the number of files scanned for malware. Although FIG. 3 illustrates a scan cache 106 that has specific attributes, those skilled in the art will appreciate that in other embodiments of the present invention, the scan cache 106 may operate with more or fewer than all of the listed attributes.

Returning to the update method 200 illustrated in FIG. 2, the method 200 identifies files (at block 212) that have the potential to be infected with the malware represented by the signature received at block 202. More specifically, entries off files in the scan cache 106 are compared to the attributes of the new malware identified at block 204. Through this comparison, the method 200 identifies files that have the potential to be infected with the new malware. For example, at block 204, the method 200 may determine that the new malware is only capable of infecting files that are Microsoft Word™ documents (e.g. files with the "DOC" file type). In this instance, the update method 200 will determine that all files with entries in the scan cache 106 with the matching file type have the potential to be infected with the malware. In the context of the scan cache 106 illustrated in FIG. 3, the file RESUME-.DOC 310 is the only file that has the potential to be infected with the malware.

As illustrated in FIG. 2, at block 214 the update method 200 change entries in the scan cache 106 that represent files that have the potential to be infected with the new malware. More specifically, files represented in the scan cache 106 that were categorized as being in the "known good" state which also have the potential to be infected with the new malware are moved to the "unknown" state. As described in more detail below with reference to FIG. 4, entries in the scan cache 106 that represent files in the "unknown" state are scanned for malware when an I/O request or other similar event occurs. Significantly, the state of a file as represented in the scan cache that is not capable of being infected with the new malware does not change. Thus, an entry in the scan cache that represents a file in the "known good" state that is not capable of being infected with the new malware will not be repetitively scanned for malware. Then the update method 200 proceeds to block 216 where it terminates.

Implementations of the present invention are not limited to the update method 200 shown in FIG. 2 or the examples provided in the accompanying text. For example, the update method 200 was described primarily in the context of instances when new malware is identified. However, those skilled in the art and others will recognize that the update method 200 may minimize the amount of data scanned for malware when the scan engine 102 (FIG. 1) is first installed on a computing device. Thus, the embodiment of the present invention described above with reference to FIG. 2 should be construed as exemplary and not limiting.

Figure 4:
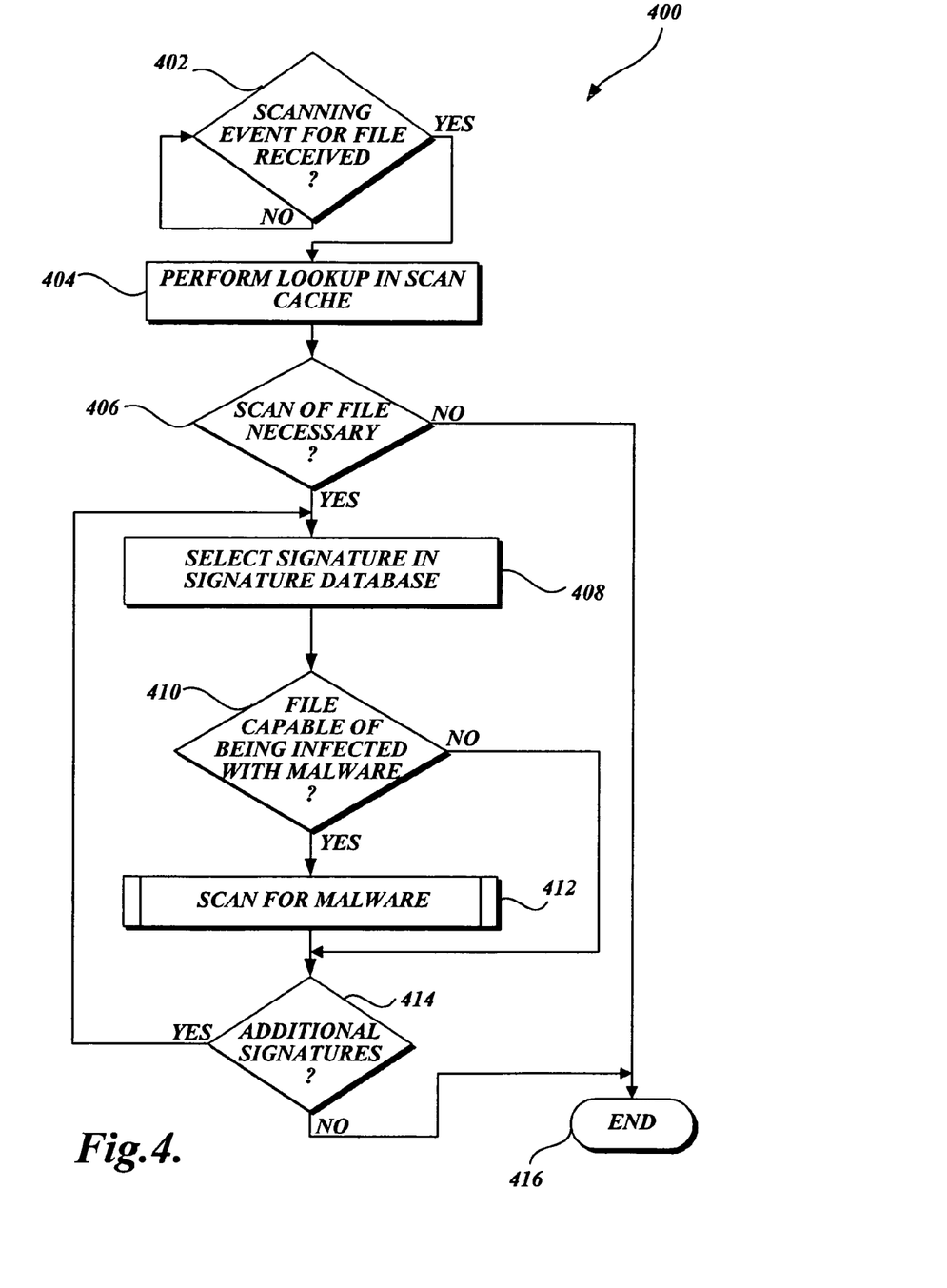
FIG. 4 is a flow diagram illustrating one exemplary embodiment of a method that determines whether to perform a scan for malware when a scanning event occurs in accordance with the present invention.

Now with reference FIG. 4, a scan method 400 that efficiently scans a file on a computing device for malware will be described. Those skilled in the art and others will recognize that the scan method 400 is designed to work in conjunction with the update method 200 and scan cache 106 described above with reference to FIGS. 2 and 3. With continuing reference to FIGS. 1-3 and the accompanying descriptions, an exemplary scan method 400 illustrated in FIG. 4 will now be described.

At decision block 402, the scan method 400 remains idle and waits for an event that typically requires a file to be scanned for malware. As will be appreciated by those skilled in the art and others, antivirus software may initiate a file scan in many different instances. For example, a computer user may issue a command to start execution of a program by "double clicking" on an icon associated with the program. To prevent malware from being executed, antivirus software may cause one or more files associated with the program to be scanned before the program is loaded into memory and executed. However, as known to those skilled in the art and others, the example provided above should be construed as exemplary and not limiting, as a file may be scanned for malware in other instances.

At block 404, the scan method 400 queries a database, such as the scan cache 106 (FIG. 3), and identifies the state of the file that is the object of the event received at block 402. As described above with reference to FIG. 3, variables are associated with files in the scan cache 106 which represent one of three possible states, including (1) known malware, (2) known good, or (3) unknown. At block 404, the method 400 performs a query of the scan cache 106 and identifies the state of the file that is the object of the event received at block 402. Since generating a query to a database may be performed using techniques generally known in the art, further description of the techniques used at block 404 will not be described further here.

At decision block 406, the method 400 determines if a scan of the file that is the object of the event received at block 402 is necessary. As mentioned previously, in one embodiment of the present invention, a file is only scanned for malware when the state of the file is unknown with regard to being infected with malware. In this instance, the scan method 400 proceeds to block 408 described below. Conversely, if the file is in a different state and a scan of the file for malware is not necessary, the method 400 proceeds to block 416 where it terminates.

At block 408, the scan method 400 selects a malware signature that is stored in a database. More specifically, in one embodiment of the present invention, the scan method 400 selects a signature stored in the signature database 108 described above with reference to FIG. 1. As described previously, the database 108 stores signatures of malware identified as being capable of infecting a computing device. When a new malware is identified, the signature of the malware is in included in the signature database 108. Then the scan engine 102 sequentially selects signatures in the signature database 108 when scanning a file for malware. However, since selecting a signature in a database with a query or equivalent mechanism is generally known in the art, further description of these techniques will not be described in further detail here.

At decision block 410, the scan method 400 determines whether the malware represented by the signature selected at block 408 is capable of infecting the file that is the object of the event received at block 402. In order to determine if the file is capable of being infected, attributes of a file are compared to metadata associated with the malware. As described previously, one aspect of the present invention associates metadata with a malware signature. The metadata may include, but is not limited to computer platforms, operating systems, and file/data types that have the potential to be infected by the malware. At block 410, the method 400 compares attributes of the file that is the object of the request received at block 402, with metadata that describes attributes of the malware. By making the comparison, the method 400 is able to determine if the file is capable of being infected with the malware. In instances when the file is capable of being infected by the malware represented by the selected malware signature, the method 400 proceeds to block 412 described below. Conversely, if the file is not capable of being infected by the malware, the method 400 proceeds to block 416 where it terminates.

At block 412, the scan method 400 causes a scan to be performed of the file that is the object of the request received at block 402. As mentioned previously, software-implemented routines in the scan engine 106 (FIG. 1) are configured to scan a file for malware. In one embodiment of the present invention, the scan performed at block 412 includes matching patterns of data to a malware "signature." However, the scan may include additional malware identification methods. For example, the scan performed at block 412 may include identifying heuristic factors that are characteristic of malware or emulating program behavior in a virtual operating environment. In any event, it should be well understood that the techniques for identifying malware described above should be construed as exemplary and not limiting. The scan method 400 may be implemented with any a number of malware scanning techniques not described herein.

At decision block 414, the scan method 400 determines if any malware signatures contained in the signature database 108 have not previously been selected. Typically, when scanning a file for malware, all of the malware signatures stored in a database are compared to data in a file. The scan method 400 sequentially selects all of the malware signatures stored in the database 108 and determines if the malware represented by the signature is capable of infecting a file. In any event, if additional malware signatures do not need to be selected, the scan method 400 proceeds to block 416 where it terminates. Conversely, if additional malware signatures will be selected, the method 400 proceeds back to block 408 and blocks 408 through 414 repeat until all of the malware signatures in the signature database 108 have been selected.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computing device that includes a database including a plurality of scan entries for storing attributes of a plurality of files, a method of selectively scanning the files for malware, the method comprising:

receiving, by a processor, a software update that contains a malware signature and metadata of a first malware, the metadata defining one or more types of files that the first malware is capable of infecting;

in response to receiving the software update that contains the malware signature and the metadata of the first malware:

identifying, by the processor, a first scan entry of the plurality of scan entries in the database, the first scan entry associated with a first file of the plurality of files, the first scan entry defining attributes of the first file including:

a first attribute indicating the name of the first file;

a second attribute indicating that the first file is not infected with malware; and a third attribute indicating a file type of the first file;

identifying, by the processor, a second scan entry of the plurality of scan entries in the database, the second scan entry associated with a second file of the plurality of files, the second scan entry defining attributes of the second file including:

a first attribute indicating the name of the second file;

a second attribute indicating that the second file is not infected with malware; and a third attribute indicating a file type of the second file;

comparing, by the processor, the one or more types of files defined in the metadata of the first malware to the file type defined in the third attribute of the first and second scan entries to determine whether the first malware is capable of infecting the first or second files;

determining, by the processor, that the first file is capable of being infected by the first malware because the file type defined in the third attribute of the first scan entry matches one of the one or more types of files defined in the metadata of the first malware;

in response to the determination that the first file is capable of being infected by the first malware, updating, by the processor, the second attribute of the first scan entry corresponding to the first file to indicate that it is not known whether the first file is infected with malware including the first malware;

determining, by the processor, that the second file is not capable of being infected by the first malware because the file type defined in the third attribute of the second scan entry does not match any of the one or more types of files defined in the metadata of the first malware; and in response to the determination that the second file is not capable of being infected by the first malware, preventing, by the processor, the update of the second attribute of the second scan entry corresponding to the second file such that the second attribute of the second scan entry continues to indicate that the second file is not infected with malware including the first malware;

after receiving the software update and in response to an I/O request for the first file, scanning the first file because the second attribute of the first scan entry corresponding to the first file indicates that it is not known whether the first file is infected with malware including the first malware; and after receiving the software update and in response to an I/O request for the second file, preventing scanning of the second file because the second attribute of the second scan entry corresponding to the second file indicates that the second file is not infected with malware including the first malware.

2. The method as recited in claim 1, wherein identifying attributes of the first malware defined by the metadata associated with the malware signature of the first malware includes:

searching the metadata associated with the malware signature of the first malware.

3. The method as recited in claim 2, wherein the metadata associated with the malware signature of the first malware further identifies computer platforms, or operating systems that the first malware is configured to infect.

4. The method as recited in claim 3, further comprising, determining if an operating system of the computing device is one of the operating systems that the first malware is configured to infect at least based on the metadata associated with the malware signature of the first malware.

5. The method as recited in claim 4, further comprising:

in response to determining if the operating system of the computing device is one of the operating systems that the first malware is configured to infect, causing the software update to be installed on the computing device.

6. A system for selectively scanning a plurality of files stored on a computing device for malware, the system comprising:

a processor; and one or more storage devices storing a database including a plurality of scan entries operative to store attributes of the plurality of files and computer executable instructions which when executed by the processor perform the following:

receiving, by a processor, a software update that contains a malware signature and metadata of a first malware, the metadata defining one or more types of files that the first malware is capable of infecting;

in response to receiving the software update that contains the malware signature and the metadata of the first malware:

identifying, by the processor, a first scan entry of the plurality of scan entries in the database, the first scan entry associated with a first file of the plurality of files, the first scan entry defining attributes of the first file including:

a first attribute indicating the name of the first file;

a second attribute indicating that the first file is not infected with malware; and a third attribute indicating a file type of the first file;

identifying, by the processor, a second scan entry of the plurality of scan entries in the database, the second scan entry associated with a second file of the plurality of files, the second scan entry defining attributes of the second file including:

a first attribute indicating the name of the second file;

a second attribute indicating that the second file is not infected with malware; and a third attribute indicating a file type of the second file;

comparing, by the processor, the one or more types of files defined in the metadata of the first malware to the file type defined in the third attribute of the first and second scan entries to determine whether the first malware is capable of infecting the first or second files;

determining, by the processor, that the first file is capable of being infected by the first malware because the file type defined in the third attribute of the first scan entry matches one of the one or more types of files defined in the metadata of the first malware;

in response to the determination that the first file is capable of being infected by the first malware, updating, by the processor, the second attribute of the first scan entry corresponding to the first file to indicate that it is not known whether the first file is infected with malware including the first malware;

determining, by the processor, that the second file is not capable of being infected by the first malware because the file type defined in the third attribute of the second scan entry does not match any of the one or more types of files defined in the metadata of the first malware; and in response to the determination that the second file is not capable of being infected by the first malware, preventing, by the processor, the update of the second attribute of the second scan entry corresponding to the second file such that the second attribute of the second scan entry continues to indicate that the second file is not infected with malware including the first malware;

after receiving the software update and in response to an I/O request for the first file, scanning the first file because the second attribute of the first scan entry corresponding to the first file indicates that it is not known whether the first file is infected with malware including the first malware; and after receiving the software update and in response to an I/O request for the second file, preventing scanning of the second file because the second attribute of the second scan entry corresponding to the second file indicates that the second file is not infected with malware including the first malware.

7. The system as recited in claim 6, wherein the metadata associated with the malware signature of the first malware further identifies computer platforms, or operating systems that the first malware is configured to infect.

8. The system as recited in claim 7, wherein the method further comprises determining if an operating system of the computing device is one of the operating systems that the first malware is configured to infect at least based on the metadata associated with the malware signature of the first malware.

* * * * *